(12) United States Patent
Blair

(10) Patent No.: US 11,768,528 B2
(45) Date of Patent: Sep. 26, 2023

(54) MULTI-DOMAIN COMPUTING SYSTEM

(71) Applicant: The Boeing Company, Chicago, IL (US)

(72) Inventor: Brandon M. Blair, Oklahoma City, OK (US)

(73) Assignee: THE BOEING COMPANY, Chicago, IL (US)

( * ) Notice: Subject to any disclaimer, the term of this patent is extended or adjusted under 35 U.S.C. 154(b) by 6 days.

(21) Appl. No.: 16/879,225

(22) Filed: May 20, 2020

(65) Prior Publication Data

US 2021/0365091 A1 Nov. 25, 2021

(51) Int. Cl.
| | |
|---|---|
| *G06F 15/177* | (2006.01) |
| *G06F 9/00* | (2006.01) |
| *G06F 1/26* | (2006.01) |
| *G06F 21/71* | (2013.01) |
| *G06F 9/4401* | (2018.01) |
| *G06F 1/16* | (2006.01) |

(52) U.S. Cl.
CPC ............... *G06F 1/26* (2013.01); *G06F 1/16* (2013.01); *G06F 9/4416* (2013.01); *G06F 21/71* (2013.01)

(58) Field of Classification Search
CPC . G06F 1/26; G06F 9/4416; G06F 1/16; G06F 21/71
See application file for complete search history.

(56) References Cited

U.S. PATENT DOCUMENTS

| | | | |
|---|---|---|---|
| 10,587,450 B1* | 3/2020 | Hartley | H04L 12/4641 |
| 2011/0010473 A1* | 1/2011 | Szolyga | G06F 1/1601 |
| | | | 710/36 |
| 2013/0091589 A1* | 4/2013 | Shiakallis | G06F 21/81 |
| | | | 726/34 |
| 2014/0122860 A1* | 5/2014 | Jai | G06F 9/4416 |
| | | | 713/2 |
| 2016/0132456 A1* | 5/2016 | Barga | G06F 13/4221 |
| | | | 710/301 |
| 2020/0225895 A1* | 7/2020 | Nishiyama | G09G 5/005 |
| 2020/0285778 A1* | 9/2020 | Soffer | G06F 21/74 |
| 2021/0232195 A1* | 7/2021 | Keilers | G06F 11/302 |

* cited by examiner

*Primary Examiner* — Xuxing Chen
(74) *Attorney, Agent, or Firm* — JORDAN IP LAW, LLC

(57) ABSTRACT

Examples provide a method and apparatus for a multi-domain computing device providing physical separation of computing domains and network isolation. The multi-domain computing device includes a user facing panel with a shared display device and a keyboard, video mouse (KVM) switch. A set of domain-specific devices which are not shared between domains may include one or more processors, card readers, network devices, headset jacks, and power switches. The devices shared by the different domains include a display screen, power supply, the KVM switch and/or touchscreen. Each domain is configured to power up, boot and operate independently within a single physical unit.

23 Claims, 11 Drawing Sheets

MULTI DOMAIN COMPUTING DEVICE 100

SET OF FIRST DOMAIN-SPECIFIC DEVICES 102

| PROCESSOR 108 | CARD READER 110 | NETWORK DEVICE 112 |

| POWER SWITCH 114 | CAMERA 116 |

SET OF SECOND DOMAIN-SPECIFIC DEVICES 104

| PROCESSOR 118 | CARD READER 120 | NETWORK DEVICE 122 |

| POWER SWITCH 124 | CAMERA 126 |

SET OF SHARED DEVICES 106

| DISPLAY DEVICE 128 | INPUT DEVICE(S) 130 / KEYBOARD 132 | KVM SWITCH 134 | POWER SUPPLY 136 |

*FIG. 1*

MULTI-DOMAIN COMPUTING SYSTEM

BACKGROUND

A computer domain typically includes a computer network and/or resources in which access by users is controlled based on user credentials for the domain. In a multi-domain system, each domain is typically housed or associated with a physically separate computing device or workstation to ensure network security and prevent unauthorized access to data across domains. Thus, two separate domains are provided in two separate computing devices or workstations. This results in inefficient utilization of space and resources.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Some aspects and implementations disclosed herein are directed at a multi-domain panel computing device. The multi-domain computing device includes a first set of domain-specific devices associated with a first computing domain having a first power switch. A second set of domain-specific devices associated with a second computing domain includes a second power switch. The first computing domain is configured to power up independently of the second computing domain. The first computing domain is network isolated from the second computing domain. A set of shared devices associated with the first computing domain and the second computing domain includes a domain-switchable display device and a KVM switch configured to switch the display device from the first computing domain to the second computing domain.

The features, functions, and advantages that have been discussed are achieved independently in various implementations or are to be combined in yet other implementations, further details of which are seen with reference to the following description and drawings.

BRIEF DESCRIPTION OF THE DRAWINGS

FIG. 1 is an exemplary block diagram illustrating a multi-domain computing device in accordance with an embodiment.

Corresponding reference characters indicate corresponding parts throughout the drawings.

DETAILED DESCRIPTION

Figure 2:
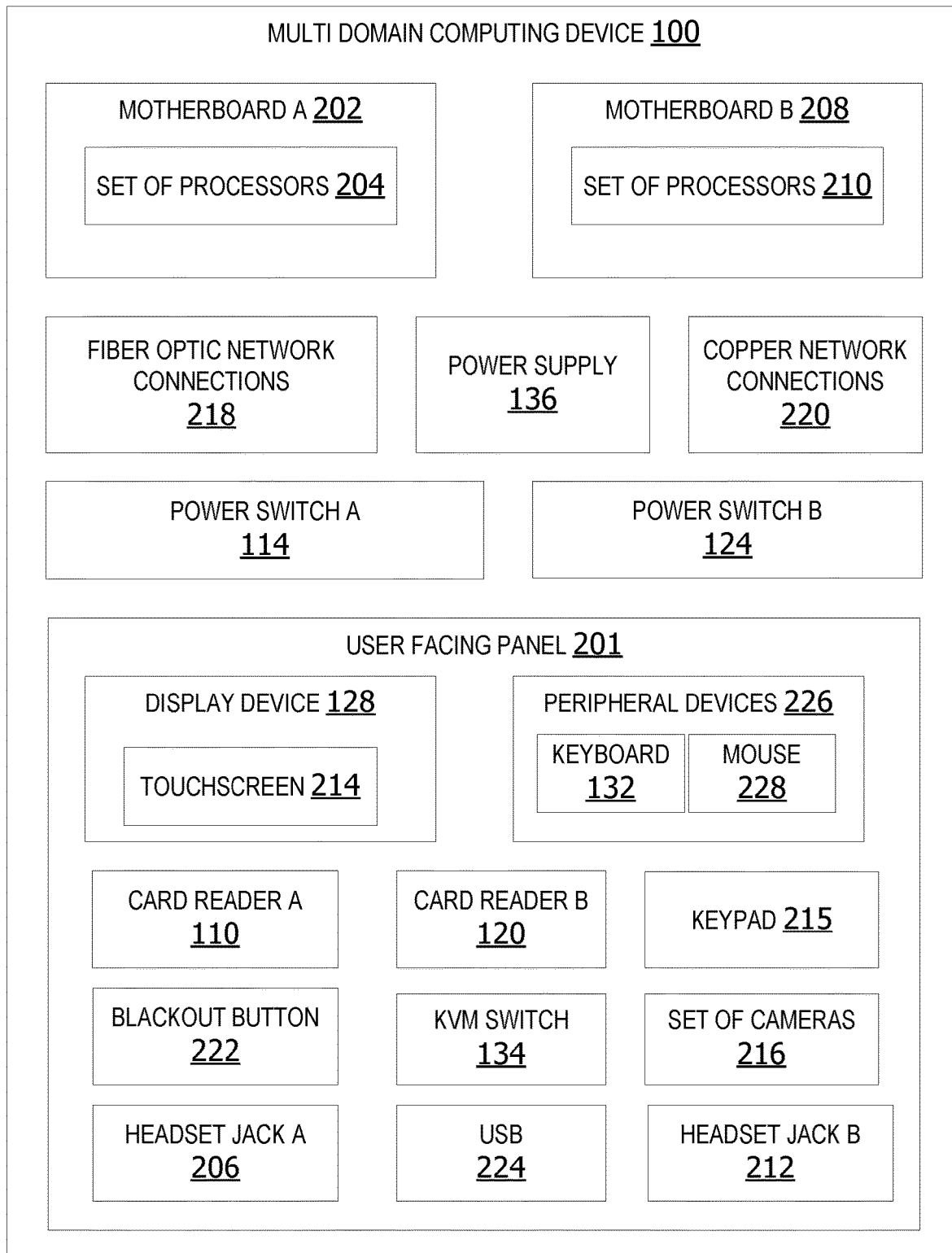
FIG. 2 is an exemplary block diagram illustrating a multi-domain computing device including a set of shared devices and a set of separate devices for utilization by two different domains in accordance with an embodiment.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Currently, computers such as those on an aircraft have multiple networks, each supporting different computing domains configured for different security levels. The term "domain" as used herein refers to a group of computer-related devices administered as a unit with a common set of procedures, rules and/or security protocols. The term "domain" encompasses all the components and data that comprise one of the two or more sets of isolated parts within the multi-domain computing device.

Due to security requirements a single computer cannot be on both networks and domains at the same time to prevent cross contamination. Virtual Machine division is insufficient for security purposes required for mission critical systems. Thus, each domain is housed on a separate physical device and several computers are provided on the network. However, rack space is limited on aircraft, the additional computers add weight, draw more power than desired, and add thermal load to the cooling system.

Aspects of the disclosure provide a rack-mountable multi-domain computing device sharing a single display device. The multi-domain computing device provides a common workstation that is versatile, rugged, and integrated while reducing the size, weight, power, and cooling load on aircraft utilizing the device.

Other aspects of the disclosure provide a switchable computer system having a common power that allows two different electrically isolated computers to operate in a single unit. Devices associated with a given domain work together, independently of the devices associated with the other, separate domain(s). A given domain can include, for example, but without limitation, the motherboard, processor, memory, headset jack, smart card reader, network connectors, fiber to copper converter, camera, etc. A device on one domain may be shared by both domains or isolated/limited to utilization by a single domain on the multi-domain computing device. This provides flexibility and scalability while improving security and data isolation.

Each domain may be associated with different levels of security, capabilities, hardware, access requirements, permissions, etc. For example, one domain may be approved for classified (e.g., high security or restricted access) level processing, while another is approved for unclassified processing. A user can connect to two separate systems at the same classification level using the two separate domains, while maintaining data separation. This situation enables users to operate classified domains simultaneously while preventing the data from intermingling with someone else's classified or restricted data.

The device in one example provides a standard Electronic Industries Alliance (EIA) 310 rack mountable computer having a common power source coupled to two electrically isolated processing systems for improved security.

The multi-domain system assists with resolving obsolescence issues with mission equipment workstations and reduces the logistics footprint by utilizing common systems. This also permits migration to a virtualized mission system architecture and reduces user's workload to prepare and perform tasks associated with the device.

Referring more particularly to the drawings, FIG. 1 provides an exemplary block diagram illustrating a multi-domain computing device 100. The multi-domain computing device 100 in some examples includes a set of one or more first domain-specific devices 102 associated with a first domain (domain A), a set of one or more second domain-specific devices 104 associated with a second domain (domain B) and a set of shared devices 106. The set of shared devices 106 includes one or more devices which are available for utilization by either the first domain (domain A) or the second domain (domain B).

The set of first domain-specific devices 102 includes one or more devices used only by the first domain (domain A). The set of first domain-specific devices 102 in this example includes a separate physical processor 108, a card reader 110, a network device 112, a power switch 114, and/or a headset jack 206 for the first domain A. The processor 108 includes any quantity of processing units and is programmed to execute computer-executable instruction.

The card reader 110 in some examples is a smart card reader for reading or scanning a smart card, such as, but not limited to, an identification (ID) card. In one example, a user inserts a smart card or other ID card into the smart card reader 110 to authenticate the user or otherwise provide credentials for authenticating the user.

The network device 112, in other examples, is a device including fiber optic network connection components and/or copper ethernet connection components enabling the multi-domain computing device 100 to connect to a local area network (LAN) via a fiber network and/or an ethernet. Each domain can, in some examples, be connected to a copper Ethernet and a fiber optic network simultaneously. In some non-limiting examples, the multi-domain computing device is installed on an aircraft and the network is part of the aircraft bus.

The power switch 114 is a switch for turning on the computing device and/or routing power from the power supply and power bus to the set of first domain-specific devices 102 and the set of shared devices 106. The power switch 114 turns power on or off to devices associated with the first domain A, such as the processor 108, and turns power on or off to shared devices, such as the display device 128.

In some examples, the power supply uses 115 volts alternating current (VAC) and 60-400 hertz (Hz) input power. The power supply provides sufficient power for the installed hardware. Direct Current (DC) output voltage from the power supply is regulated to suppress electrical transients generated in the item or received from an external source. The power supply may include input over- and under-voltage protection. The power supply in some examples has output short circuit protection. The maximum steady-state power consumption of the item may be one hundred Watts (100 W) or less, excluding any load on the USB charging port. Minimizing power consumption, while maintaining compliance with all other requirements, is a design objective.

In some examples, the two power switches are located on the front panel of the multi-domain computing device. The power switches may be recessed or guarded to prevent accidental operation. The user can power on each domain independently from the other domain. If either domain is powered on, the multi-domain computing device provides power to all components except those exclusively used by the other domain. If both domains are powered on and one is then powered off, all of the components continue to be powered, except those exclusively used by the unpowered domain. The power supply remains unenergized if both power switches are turned off.

In some examples, the multi-domain computing device 100 includes a light emitting diode (LED) indicator mounted adjacent to, or integrated with, the power switches. The indicator illuminates when power is applied and the associated power switch is turned on. The indicator is extinguished (goes off) when the power switch is turned off, regardless of whether power is being applied to the multi-domain computing device 100.

In some examples, the set of first domain-specific devices 102 can optionally also include a camera 116. The camera 116 is a web camera or other image capture device mounted or otherwise attached to a chassis or other housing member of the multi-domain computing device 100. In one example, the camera 116 is a high definition (HD) camera. In some examples, the set of domain A devices includes a headset jack for attaching a headset or other audio device, such as a microphone or speaker.

The set of second domain-specific devices 104 includes one or more devices accessible by only the second computing domain (domain B). In some examples, the set of second domain-specific devices 104 includes a processor 118, a card reader 120, a network device 122, a power switch 124 and/or a headset jack, such as, but not limited to, the headset jack 212 shown in FIG. 2 below. The processor 118 can include one or more processor devices associated with a motherboard. The card reader 120 is a smart card reader. The network device 122 is a device enabling the second domain to connect to a LAN via a fiber network or a copper ethernet connection. The power switch 124 turns on the power supply or enables power to flow from the power bus to the processor 118 for the second domain.

The multi-domain computing device 100 in this example further includes a set of shared devices 106. The set of shared devices 106 includes one or more devices which are accessible or otherwise utilized by both the first and second domains. The set of shared devices 106 in some examples includes a display device 128. The display device in some examples is a display screen, such as, but not limited to, a touchscreen for displaying data to the user. The display device 128 switches between domains such that the display device 128 presents output associated with only one domain at a time. Thus, when the user selects the first domain A, the display device displays a screen for the first domain. If, for example, the user switches the screen to the second domain B, the image on the screen is switched over to display an image associated with the second domain B.

In some examples, the display device has a minimum active display size of 19.0 inches diagonally and a minimum native screen resolution of 1280×1024 (5:4 aspect ratio). The display device may include a minimum of 16 million colors and a minimum brightness of 250 nits after all required coatings and layers have been applied. The brightness is adjustable from an On-Screen Display (OSD) keypad installed in the front panel of the item. The display device can optionally also include a minimum contrast ratio of 300:1. The contrast is adjustable from an OSD keypad installed in the front panel of the item. An anti-reflective coating may be applied to minimize screen reflections. The viewing angle is between +/−85 degrees horizontally and +/−80 degrees vertically.

The set of shared devices 106 can include one or more input device(s) 130 shared by both domains, such as, but not limited to, a keyboard 132, a mouse, a track ball, a touchscreen pen, or other input devices.

A keyboard, video and mouse (KVM) switch 134 switches input received from the keyboard 132, mouse, touchscreen or other input device(s) from the first domain to the second domain. The KVM switch may also be referred to as a KVM+T switch. The KVM switch 134 switches the I/O from the keyboard, mouse, touchscreen, and display from one domain to the other domain. The shared devices can also include a shared power supply 136 providing power to electrical devices associated with both domain A and domain B.

In one example, if the user selects the first domain, the KVM switch 134 is configured such that the keyboard, touchscreen and mouse provide input from the user to the programs, operations or applications running in the first domain. If the KVM switch 134 is switched to the second domain, the input device(s) 130 provide input from the user to the second domain applications or other programs.

In a non-limiting example, the multi-domain computing device has a height of approximately 15.75 inches. However, the examples are not limited to a height of 15.75 inches. In other examples, the multi-domain computing device 100 is fifteen inches high, nineteen inches high or any other suitable height.

The multi-domain computing system in some examples provides the user the capability of setting basic input/output system (BIOS) passwords. To the maximum extent possible, the BIOS passwords are set to accept and use at least one or more each of upper-case letters, lower case letters, numbers, and special characters. If the BIOS allows two levels of access (e.g. user and admin), then a different password may be used for each level. Each domain has a unique set of BIOS passwords. As a design objective, the initial BIOS passwords may be as complex as the BIOS allows.

The multi-domain computing device maintains boot settings in a non-volatile, Unified Extensible Firmware Interface (UEFI) that does not require a battery or battery-like device to maintain boot settings. The firmware version number of the UEFI may be visible from the UEFI screen. System clock data may be provided over the network interface.

In some examples, each computing domain is powered on independently with separate, illuminating Dual Pole Single Throw (DPST) power switches. Turning on a switch powers up that domain and the shared components, such as, but not limited to, liquid crystal display (LCD), video controller, KVM+T switch, & USB-C charging port).

The system in some non-limiting examples is pre-boot executable environment (PXE) bootable. The multi-domain computing device downloads a boot image from dynamic host configuration protocol (DHCP)/trivial file transfer protocol (TFTP) server using copper and fiber network I/O linked via an internal hub to the motherboard. This allows the use of either Ethernet or fiber network connections. In one example, the system permits simultaneous Ethernet/fiber connectivity by each domain.

The dedicated smart card reader is provided for each domain in other examples. The card readers are capable of reading tokens associated with user credentials. The card readers are separate for improved security. Dedicated audio/microphone interface provides output audio and voice over internet protocol (VOIP) capability.

CPU and RAM requirements are provided to sustain operations. The multi-domain computing device does not include user-accessible writable non-volatile memory. The system supports graphical processing unit (GPU) acceleration and HD video streaming. Secure video teleconferencing (SVTC) may also be supported in another example.

FIG. 2 is an exemplary block diagram illustrating a multi-domain computing device 100 including a set of shared devices and a set of separate devices for utilization by two different domains. The set of separate devices associated with the first domain A includes a first motherboard 202 and a set of one or more processors 204, such as the processor 108 in FIG. 1. The domain A set of separate devices further includes a separate card reader 110 and a power switch 114.

In some examples, a user facing panel 201 of the multi-domain computing device includes two combined headphone/microphone headset jacks on the front of the unit near the bottom that interfaces with the audio output and microphone input connectors on the motherboards. One headset jack is connected to each of the computer domains. The two headset jacks may be placed to comply with any applicable separation requirements.

In this example, the multi-domain computing device 100 can optionally include a first headset jack 206 enabling a user to plug in a headset or other audio device for receiving audio output from applications, software, or other programs associated with the first domain. For example, the headset jack 206 may be used during a video conference or conference call over the network on the first domain.

The set of separate devices associated with the second domain B includes a second motherboard 208 having a set of one or more processor 210, such as, but not limited to, the processor 118 in FIG. 1. The set of separate devices for the second domain in other examples includes a card reader 120 and a power switch 124. The multi-domain computing device 100 can optionally also include a headset jack 212 for the second domain.

The domain A power switch 114 powers up the set of first domain-specific devices independently from the set of second domain-specific devices when the domain A power switch 114 is turned to the "on" position or otherwise switched on. The domain B power switch 124 likewise powers up the set of second domain-specific devices independently from the domain A devices when the domain B power switch 124 is turned to the "on" position or otherwise switched on. All shared devices are powered up when either the domain A power switch 114 or the domain B power switch is turned on. The shared devices are also powered up when both the domain A and domain B power switches are turned on. The shared devices receive no power when both the domain A and domain B power switches are turned off.

The domain A power switch 114 and the domain B power switch 124 can be located anywhere on the chassis of the multi-domain computing device. In some non-limiting examples, the domain A power switch 114 and the domain B power switch 124 are located on the user facing panel of the multi-domain computing device. However, the examples are not limited to including the domain A power switch 114 and the domain B power switch 124 on the user facing panel. In other examples, the domain A power switch 114 and the domain B power switch 124 can be located on the side of the chassis, the top of the chassis, the bottom of the chassis, the back of the chassis or any other suitable location on the multi-domain computing device.

The set of shared devices on the multi-domain computing device 100 in some examples includes a shared OSD keypad 215 enabling the user to adjust contrast, brightness and/or other features of the display device 128. The OSD keypad 215 can be used to adjust the image display for either the first or second domain. The keypad 215 adjusts the displayed image associated with the user-selected domain. A domain can be selected for display on the display device via the KVM switch 134. The set of shared devices in some examples also includes a shared power supply 136.

In some examples, the OSD keypad allows the brightness and contrast to be adjusted. The OSD keypad optionally includes a "blackout" button that cycles power on/off to the screen only, without affecting either computer domain. The OSD keypad has a black membrane with white buttons and black markings.

The user facing panel 201 of the multi-domain computing device 100 can optionally include a set of one or more cameras 216, such as, but not limited to, the camera 116 in FIG. 1. In some examples, the set of cameras 216 includes a single camera associated with the first domain. In other words, only the first domain A can access or utilize the camera.

In this example, the set of cameras 216 includes two cameras, a first camera for the first domain and a second camera for utilization by the second domain. The first camera 116 and the first headset jack 206 can be used to provide audio and video input to applications and operations running on the first domain. Likewise, the second camera 126 and the second headset jack 212 provides audio and video input to applications and operations running on the second domain.

In still other examples, the set of cameras includes a single camera which is shared by both domains. In this example, the KVM switch 134 also switches the camera to whichever domain is selected by the user. Thus, if the user selects the first domain, the camera can be used during conference calls on the first domain. When the user selects the second domain, the camera is also switched over for utilization by the second domain.

The display device 128 in this example includes a touchscreen 214 which receives input from the user and provides output to the user. However, the examples are not limited to a touchscreen. In other examples, the display device 128 is an LCD screen or any other type of display screen. The touchscreen in some examples is an infrared touchscreen capable of receiving input from a bare finger, gloved finger, or stylus. Touchscreen output data is switchable and directed only to the domain currently selected on the integrated KVM+T switch.

The multi-domain computing device 100 includes fiber optic network connections 218 enabling both domains to utilize a fiber optic network. The multi-domain computing device 100 also includes copper network connections 220 for enabling both domains to connect to an ethernet connection. Each domain is network independent.

A blackout button 222 enables a user to blackout the images displayed on the display device 128. For example, if the user wants to prevent someone else from viewing content being displayed on the display device 128, selection of the blackout button switches the display to a black screen. When the user selects the blackout button 222 again, the display device restores the previous image for viewing by the user.

A universal serial bus (USB) port 224 is provided in other examples. The USB port 224 enables a user to power peripheral devices, such as cellular telephones, laptop computers, tablets or other devices. In some examples, the USB port is a universal serial bus type C (USB-C) charging port.

In one non-limiting example, the USB port 224 is a front-facing USB-C charging port complying with the USB Power Delivery 3.0 standard. The USB-C port provides up to one hundred watts (100 W) of electrical power to the port to enable the charging of compatible devices. Data transfer between a device connected to the USB-C port and both computer domains is prevented for improved security.

One or more peripheral devices 226 may be removably attached to the multi-domain computing device 100. In some examples, the set of peripheral devices 226 includes a keyboard 132 and/or a mouse 228.

Thus, in one non-limiting example, the multi-domain computing device 100 is comprised of a touchscreen display, HD camera, KVM+T switch, USB-C charging port, and two independent computer domains each containing a separate power switch, motherboard, copper and fiber optic network interfaces, smart card reader, and headset jack.

In some examples, the multi-domain computing device includes two smart card readers accessible from the front of the chassis. One smart card reader is connected directly into each computer domain. The smart card readers are not connected through the KVM+T switch in some examples.

The integrated secure KVM+T switch in other examples is provided to switch the input/output devices between the two domains. Keyboard and mouse inputs are provided through a keyboard connector. The video and touchscreen signals originate from within the multi-domain computing device.

In still other examples, the multi-domain computing system supports VOIP telephone calls using one or more headset jacks. A soft Video Teleconference Unit (soft-VTU) and video chat capability may be provided on domain A using an integrated HD camera and the headset jack. A camera cover optionally provides a captive and reusable means to cover the camera when not in use.

The set of shared devices in some examples includes the display device, touchscreen interface, power supply, power bus, keypad, KVM switch, keyboard, mouse, trackball and/or any other peripheral devices. The set of domain-specific, dedicated (unshared) devices includes power on switch, motherboard, smart card reader, headset jack, camera, wiring for isolation and/or network (LAN).

Thus, in some non-limiting examples, the user facing panel 201 includes a display device 128, a domain A card reader 110, a domain A headset jack 206, a domain B card reader 120, a domain B headset jack 212, a KVM switch 134, and one or more input/output devices. The input/output devices can include the keyboard 132, the mouse 228, the touchscreen 214, one or more USB ports, the camera 116, the camera 126, and/or any other input/output devices. The user facing panel 201 can optionally also include the keypad 215, the USB port 224, a blackout button 222, or other devices.

In other non-limiting examples, the user facing panel 201 includes a keypad 215, USB 224, a domain A card reader 110, a domain B card reader 120, a domain A power switch 114, a domain B power switch 124, a display device 128, a domain A camera 116, a touchscreen 214, a keyboard 132, a mouse 228, a blackout button 222, a domain A headset jack 206 and a domain B headset jack 212. In yet another example, the user facing panel 201 can optionally include both the domain A camera 116 and the domain B camera 126.

Figure 3:
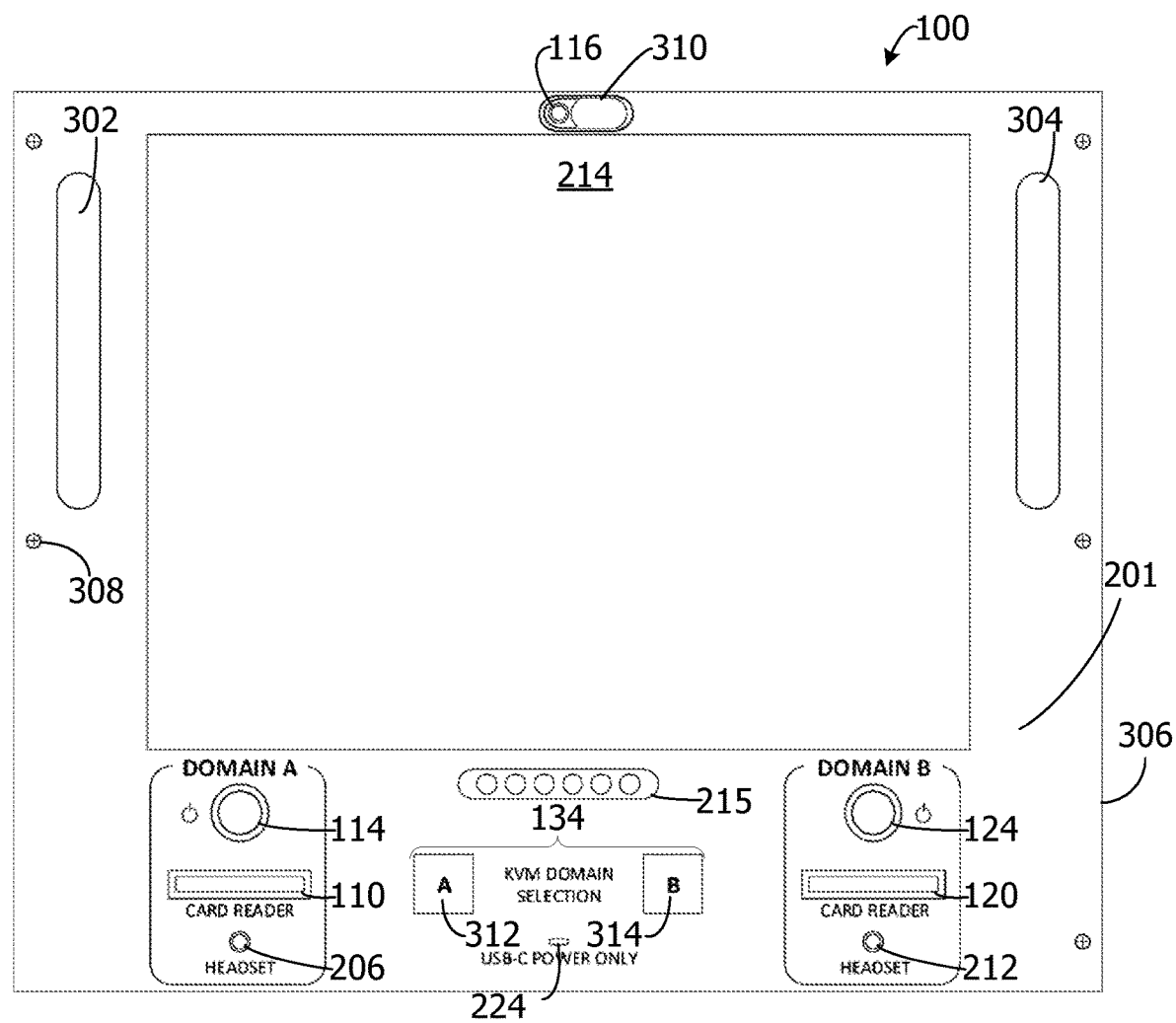
FIG. 3 is an exemplary block diagram illustrating a user facing panel in a front view of a multi-domain computing device in accordance with an embodiment.

FIG. 3 is an exemplary block diagram illustrating a user facing panel 201 in a front view of a multi-domain computing device 100. The multi-domain computing device 100 has a user facing panel 201 for operation of the first domain A and the second domain B associated with a single chassis of the multi-domain computing device 100.

The user facing panel 201 of the multi-domain computing device 100, in some examples, includes a shared touchscreen 214, keypad 215, and KVM switch 134. The first domain A includes a power switch 114, a card reader 110 and/or a headset jack 206. The second domain B includes a power switch 124, a card reader 120 and/or a headset jack 212. The user facing panel 201 of the multi-domain computing device 100 in other examples includes a USB port 224 for powering a device.

The chassis of the multi-domain computing device 100 in some non-limiting examples includes a set of one or more handles for lifting or adjusting the multi-domain computing device 100, such as, but not limited to, the first handle 302 and the second handle 304. The examples are not limited to two handles in the chassis of the multi-domain computing device 100. In other examples, the multi-domain computing device 100 may include no handles, a single handle, as well as three or more handles in the chassis. The pair of fixed one-hand bar handles are optionally sized to substantially conform to a human hand or a portion of a human hand on the front of the chassis. In other examples, the handle optionally includes ridges or contours configured to conform to one or more fingers of the user.

The chassis may optionally include a set of fasteners for installing or mounting the multi-domain computing system in a rack or console. The set of fasteners may include one or more screws, bolts, pins, staples, clamps, hinges, welds, glue, or any other type of fastener, such as, but not limited to, the screw 308. In the example shown in FIG. 3, five screws are shown. However, the examples are not limited to five screws. In other examples, no screws may be visible from the front of the chassis, one screw may be visible, as well as two or more screws may be visible to an observer looking at the front of the chassis. In one example, the set of fasteners includes six screws.

In other examples, the user facing panel 201 of the multi-domain computing device 100 includes one or more cameras, such as, but not limited to, the camera 116. The camera 116 may optionally also include a camera cover 310 removably attached to at least a portion of the chassis. The camera cover 310 slides over the camera 116 to at least partially block the camera 116 when the camera is not in use. The camera cover 310 provides additional security, preventing unintended activation of the camera 116.

The KVM switch in this example includes a domain A (first domain) switch 312 and a domain B (second domain) switch 314. When the user wants to switch the keyboard, mouse, display screen and/or touchscreen to the first domain, the user presses, pulls, flips or otherwise activates the domain A switch 312. If the user wants to switch the keyboard, mouse, display screen and/or touchscreen to the second domain, the user presses, pulls, flips or otherwise activates the domain B switch 314.

The multi-domain computing device 100 provides an actual physical machine distinction between domains. In an example, the computing domain A can be classified and the computing domain B on the same multi-domain computing device 100 can be non-classified (e.g., unclassified or have a different classification level, such as, but not limited to, confidential or limited access). In another example, both domains can be classified and have different levels of security (classification levels) authorizations required for access.

The multi-domain computing device 100 in an example shares a single power source without a hard drive on either domain. The multi-domain computing device 100 boots by downloading a boot image from a boot server. Each computing domain boots up separately and can require different login credentials. Thus, a user that is logged into domain A may be unable/unauthorized to login to domain B.

Figure 4:
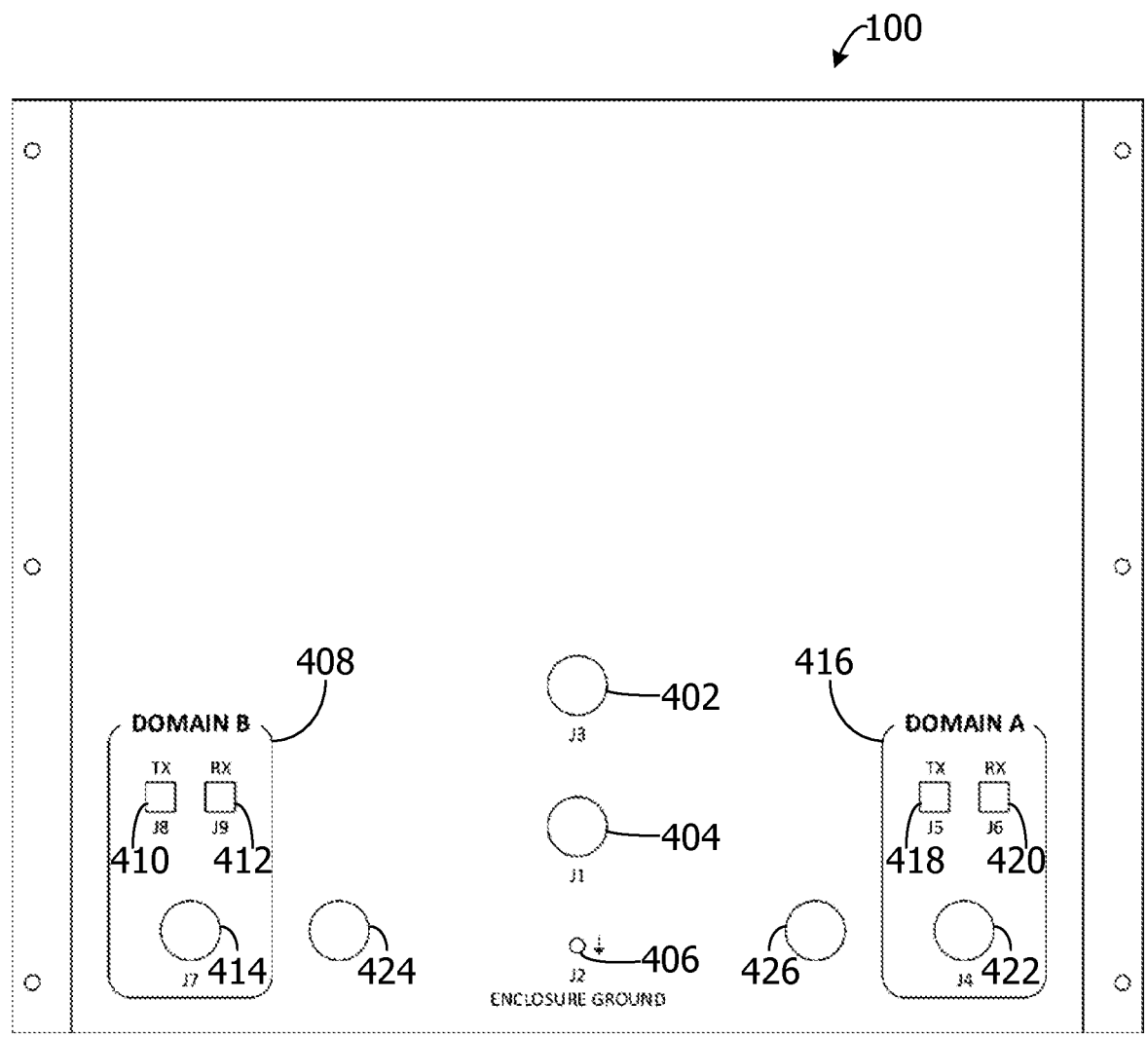
FIG. 4 is an exemplary block diagram illustrating a back view of a multi-domain computing device in accordance with an embodiment.

FIG. 4 is an exemplary block diagram illustrating a back view of a multi-domain computing device 100. The multi-domain computing device 100 includes a keyboard connector 402 for connecting a keyboard and mouse/trackball to the multi-domain computing device 100, a power connector 404 for connecting a power source to the multi-domain computing device 100, and/or a ground stud 406. The ground stud may also be referred to as an enclosure ground.

In some non-limiting examples, the multi-domain computing device has a quarter inch (0.25") diameter ground stud 406 installed. The ground stud 406 is installed adjacent to the power connector. In a non-limiting example, the ground stud 406 optionally includes a helical lock-spring, corrosion protection flat washers and/or brass nut.

The multi-domain computing device 100 includes a set of connection ports 408 associated with a second domain (domain B). The set of connection ports 408 includes a fiber connection (transmission) port 410, a fiber connection (receiving) port 412 and an ethernet connector 414. The set of connection ports 416 associated with the first domain (domain A) is a physically separate and distinct set of connections. The second set of connection ports 416 includes a fiber connector (transmission) port 418, a fiber connection (receiving) port 420 and an ethernet connector 422.

In a non-limiting example, the multi-domain computing display for each of the two domains includes one gigabit copper Ethernet interface and one fiber optic network interface. For each domain, the Ethernet and fiber optic signals are linked on an internal hub such that the linked domain may have network access through either network interface. The network connectors on the rear of the display are grouped such that those networked together in one domain are co-located and the domain (A or B) is clearly marked.

In some examples, the multi-domain computing device 100 includes a set of one or more stowage connectors. In this example, the set of stowage connectors includes a first stowage connector 424 and a second stowage connector 426. However, the examples are not limited to two stowage connectors. In other examples, the multi-domain computing device 100 may include no stowage connectors (null set), a single stowage connector, as well as three or more stowage connectors.

The connectors, in some examples, are grouped by domain, where applicable, and comply with the spacing requirements. The domain is clearly marked on the chassis near the grouped connectors.

Figure 5:
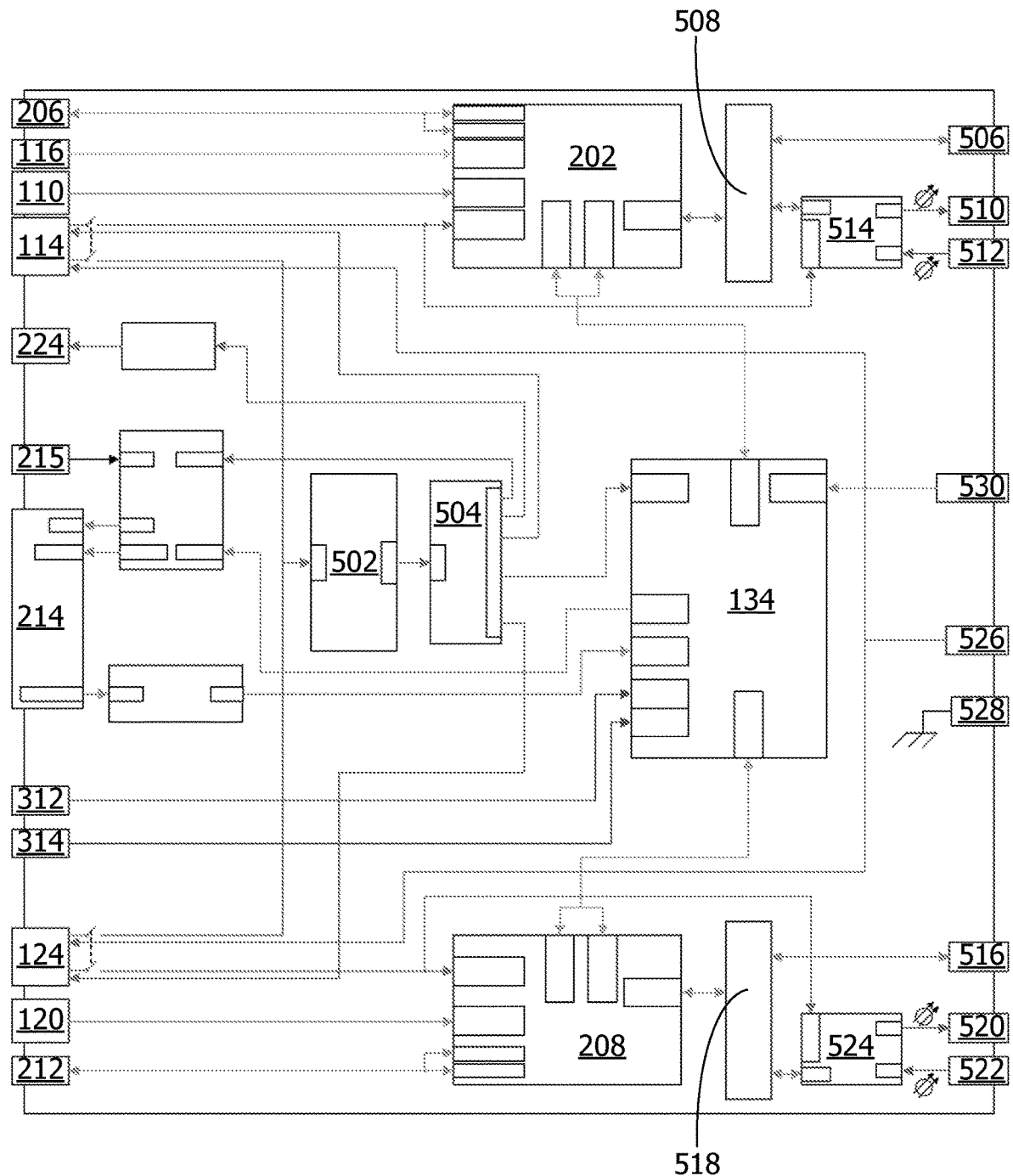
FIG. 5 is an exemplary block diagram illustrating an electrical diagram for a multi-domain computing device in accordance with an embodiment.

FIG. 5 is an exemplary block diagram illustrating an electrical diagram 500 for a multi-domain computing device. In some examples, when a user selects the first domain A power switch 114 to activate the first domain, an internal power supply 502 supplies power through a power bus 504. In this non-limiting example, the power supply 502 receives one hundred fifteen volts (115 V) alternating current (VAC) and between sixty and four hundred (60-400) hertz (Hz) electricity and then converts it to the necessary DC power voltages for use on the power bus 504.

When the first domain A power switch 114 is activated, power is provided to the first domain A motherboard 202. If the first domain A power switch 114 is de-activated (turned off), no power is provided to the domain A motherboard 202. Likewise, when the second domain B power switch B 124 is activated, power is supplied from the power supply 502 through the power bus 504 to the domain B motherboard 208 from the power switch B 124.

Whenever the multi-domain computing device 100 is plugged in, turned on or otherwise receiving power from a power supply, the USB port 224 receives power. In other words, if either domain A or domain B is turned on, the USB port 224 is powered on and ready for use. A user can plug one or more devices into the USB port 224 for recharging, such as, but not limited to, a user device.

The USB port only permits power to flow out to power connected devices. There is no network or other data connection made available to the USB port by virtue of the wiring from the power supply going direct to the USB port and not routing through either domain. This prevents the user device from accessing restricted content associated with the computing domains associated with the multi-domain computing device.

In order to utilize the keyboard/mouse 530 or touchscreen 214 with domain A, the user switches the KVM switch 134 to domain A switch 312. This enables input from the keyboard/mouse 530 and/or touchscreen 214 to be fed to the domain A motherboard 202. If the user switches the KVM switch 134 to domain B switch 314, the input is fed to the domain B motherboard 208 instead. This enables both domains to utilize a single keyboard, mouse, display device and/or touchscreen.

Each domain in this example is configured to utilize both fiber optic network connections as well as copper ethernet network connections. As shown in FIG. 5, domain A ethernet 506 copper connections provide ethernet LAN 508 for the first domain. A domain connects to a LAN via a copper ethernet or fiber optic network on the same computing domain.

In some examples, a pair of two fiber optic network interfaces consisting of a transmit and receive pair are provided. The fiber optic network interfaces may include a pair of straight tip (ST) connectors. In this example, fiber optic network connections, such as the fiber transmission (Tx) 510 and/or fiber receiving (Rx) 512, connect with fiber-to-copper converter 514 to provide fiber optic network capability for the first domain.

Domain B ethernet 516 copper connections in some non-limiting examples provide ethernet LAN 518 for the second domain. Fiber optic network connections, such as the fiber transmission (Tx) 520 and/or fiber receiving (Rx) 522, connect with fiber-to-copper converter 524 to provide fiber optic network capability for the second domain. An enclosure or chassis ground 528 is also provided in some examples.

The LAN 508 and the LAN 518 are the internal networks that link each domain's motherboard to fiber optic network connectors (via the fiber to copper converter) and the Ethernet connector. The LAN 508 and 518 in this non-limiting example are internal networks. A WAN or other external network are utilized, separately from the LAN 508 and 518, to download a boot image or provide connectivity to external servers or the internet. The multi-domain computing device 100 system architecture provides network isolation for the separate domains, namely domain A and domain B.

In some examples, the multi-domain computing device 100 operates all of the internal systems when provided with 115 VAC, 60 Hz input power at the power input connector 526. In other examples, the multi-domain computing device 100 operates all of the internal systems when provided with 115 VAC, 400 Hz input power at the power input connector 526. The multi-domain computing device 100 in still other examples operates from either the 60 Hz or 400 Hz power input automatically without any manual input or switching performed by the user.

Thus, when domain A is activated, the system provides power to the devices which are used exclusively by domain A, such as, but not limited to, the domain A motherboard 202, domain A LAN 508 components, headset jack 206, camera 116, smart card reader 110 and/or domain A power switch 114. The shared devices also receive power, such as, but not limited to, the keyboard/mouse 530, USB port 224, keypad 215, KVM switch 134 and/or touchscreen 214.

In other examples, when domain B is activated or otherwise turned on, the system provides power to the devices which are associated with domain B, such as, but not limited to, the domain B motherboard 208, domain B LAN 518 components, headset jack 212, smart card reader 120 and/or the domain B power switch 124. The shared devices also receive power, such as, but not limited to, the keyboard/mouse 530, USB port 224, keypad 215, the KVM switch 134 and/or touchscreen 214.

The connector for power input splits into two lines before it reaches any components, in this example. One line goes to domain B power switch and the other goes to domain A power switch. If the power switch is activated, it conducts power up to the power supply and that converts it to voltage needed for the system. In an example, the voltage is twelve volts (12 V). If domain B switch is turned on, the switch provides power to the domain B dedicated devices from the power supply, including the domain B motherboard.

When the power supply is available, it is available to both domains, even if the domains are switched off. When the power switch is activated for domain B and not domain A, the power is supplied to the domain B motherboard as soon as the power switch is activated. When this domain B switch is activated it is conducting input power up to the power supply. The power supply converts it to 12-volt power on the power bus. The domain B motherboard gets output power from power bus by routing the power from the power bus back to switch before going to motherboard.

In other examples, the power bus also routes power to the KVM switch when either computing domain is powered up. The KVM switch is the hub for the shared keyboard and mouse input and video from the KVM switch. The KVM switch also interfaces with the touchscreen display. The KVM switch receives power even if the user is only running one domain on the multi-domain computing device.

In still other examples, each domain is connected to a dedicated card reader. The user logins in by inserting a card into the card reader and entering a Personal Identification Number (PIN) to unlock credentials enabling the user to access the domain at the user's authorized access level.

Figure 6:
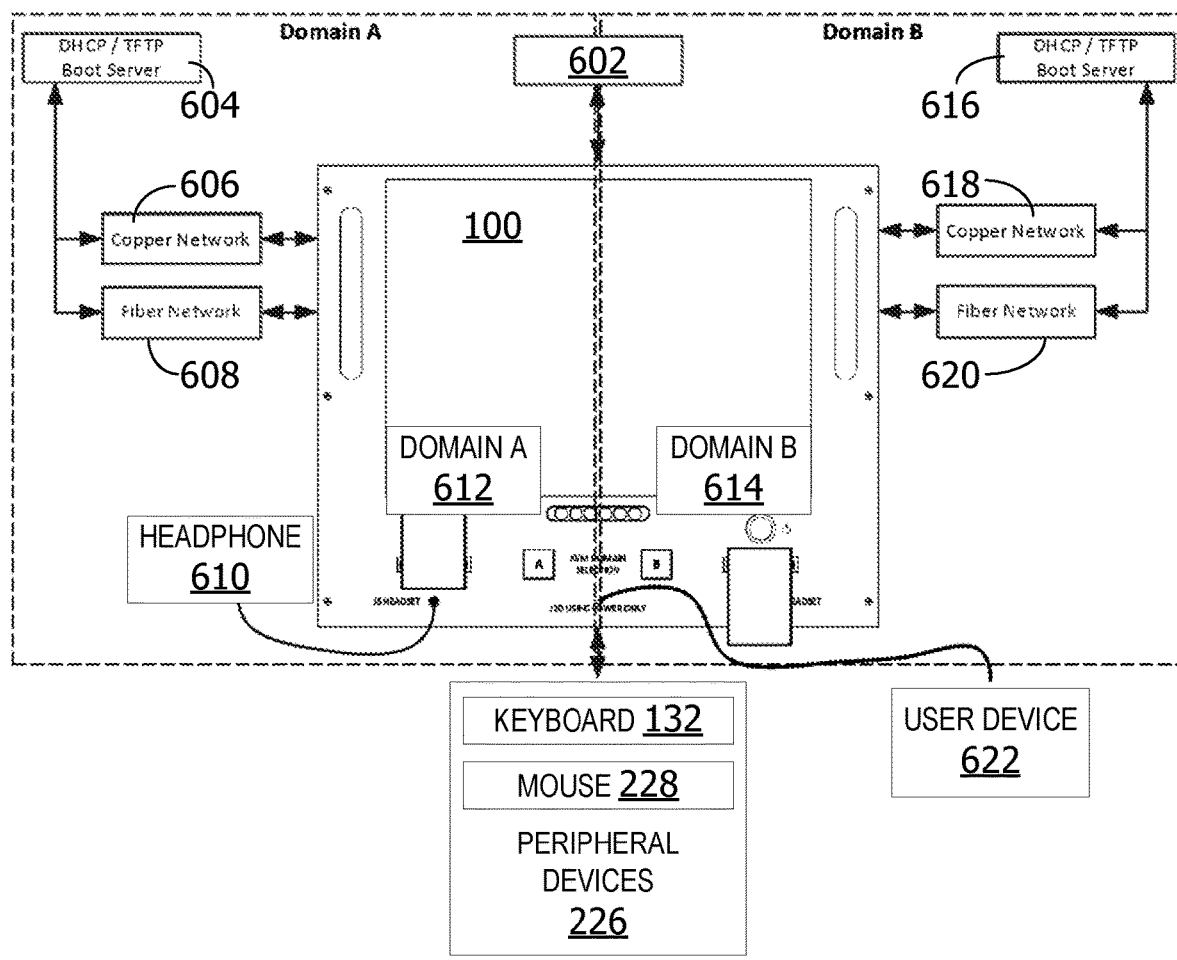
FIG. 6 is an exemplary block diagram illustrating a multi-domain system architecture in accordance with an embodiment.

Referring now to FIG. 6, an exemplary block diagram illustrating a multi-domain system architecture 600 is shown. The multi-domain computing device 100 receives power from an external power source 602. The external power source 602 provides power to the power connector, such as, but not limited to, the power input connector 526 in FIG. 5. In some examples, if at least one of the domain power switches are turned on, the internal power supply 502 has power applied to it. If all the domain power switches are turned off, the internal power supply 502 does not have power supplied to it.

When the user selects or activates the power switch for the first domain A 612, the system associated with domain A 612 requests a boot image from a boot server 604 using DHCP and/or TFTP. The boot image may be transferred to the multi-domain computing device 100 from the boot server via the ethernet copper network 606 or the fiber network 608.

In some examples, each domain of the multi-domain computing device 100 supports copper Gigabit Ethernet (1000BASE-T) connectivity that complies with the Institute of Electrical and Electronics Engineers (IEEE) 802.3AB standard. Each domain may have linked network interfaces.

Once booting is complete, the system powers devices associated with domain A, such as, but not limited to, the headphone (headset) 610 jack. It also receives input from shared peripheral devices 226, such as, but not limited to, a keyboard 132 and/or mouse 228.

In other examples, on activation or selection of the power switch for the second domain B 614 by a user, the system associated with domain B 614 requests a boot image from the boot server 616 using DHCP/TFTP. The boot image may be transferred to the multi-domain computing device 100 from the boot server via the ethernet copper network 618 associated with domain B or the fiber network 620 associated with domain B 614. Once booting is complete, the system powers devices associated with domain B 614. It also receives input from shared peripheral devices 226, such as, but not limited to, a keyboard 132 and/or mouse 228.

The USB port is active when at least one domain is powered on. In some examples, a user may power devices, such as the user device 622, via a USB port on the multi-domain computing device 100 when the system is turned on or otherwise receiving power from the power supply 502.

The user device 622 represents any device executing computer-executable instructions. The user device 622 can be implemented as a mobile computing device, such as, but not limited to, a wearable computing device, a mobile telephone, laptop, tablet, computing pad, netbook, gaming device, USB battery pack, power bank and/or any other portable device. The user device 622 in some non-limiting examples, includes at least one processor and a memory. The user device 622 can also optionally include a user interface component.

The example of the multi-domain computing device shown in FIG. 6 does not include a camera. In other examples, the multi-domain system architecture 600 can include one or more cameras.

The examples shown in FIGS. 3-6 illustrates some marking and labeling of devices on the multi-domain computing device 100. However, the examples are not limited to the markings and labels shown herein. In other examples, the multi-domain computing device 100 includes no markings or labels. In still other examples, the multi-domain computing device 100 includes different markings or labels than the ones shown in the illustrative examples. Likewise, any markings or labels may be provided in different locations than those shown in the FIGS. 3-6.

Figure 7:
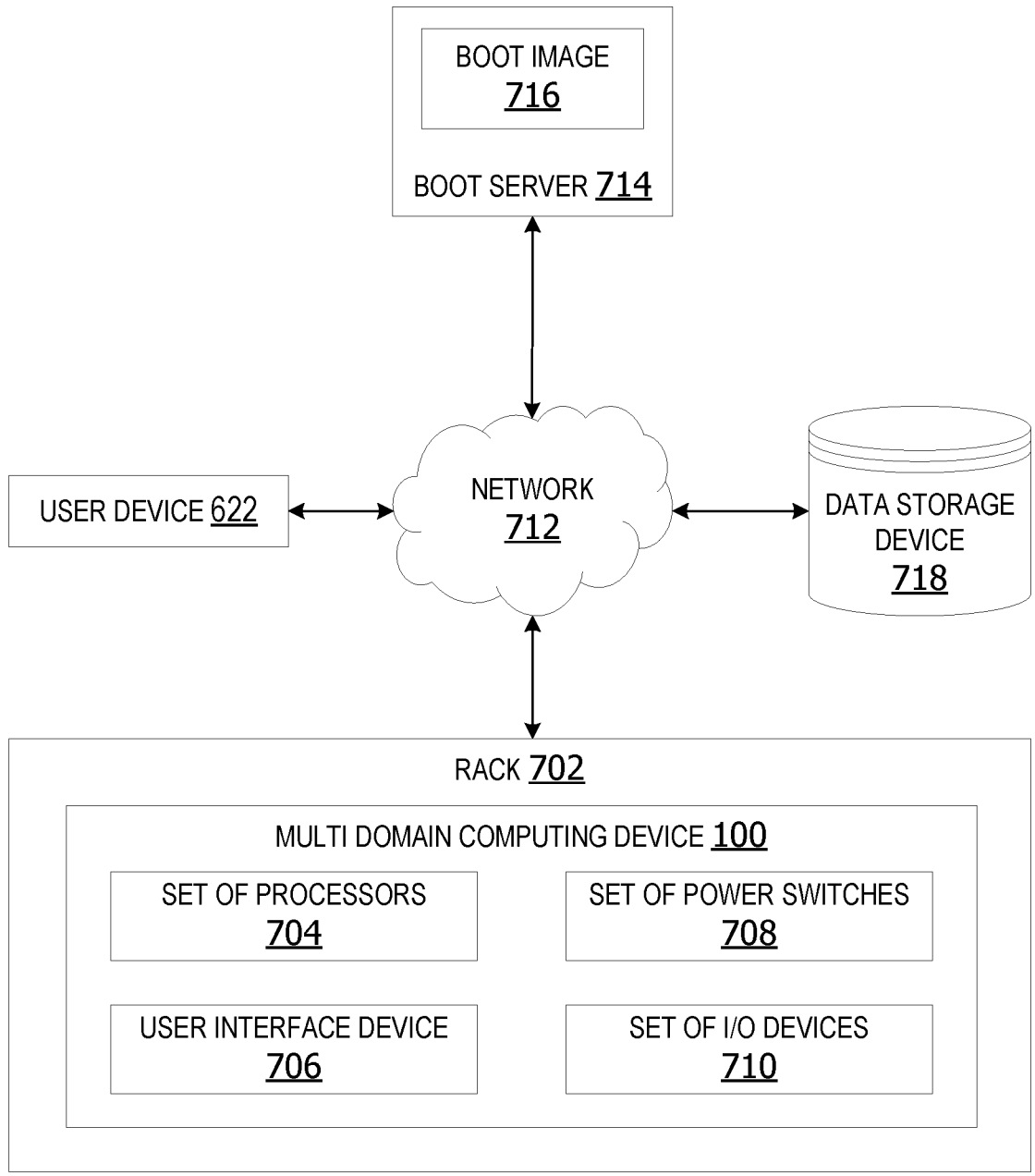
FIG. 7 is an exemplary block diagram illustrating a rack-mountable multi-domain computing device in accordance with an embodiment.

Turning now to FIG. 7, an exemplary block diagram illustrating a rack-mountable multi-domain computing device is shown. The multi-domain computing device 100 in some examples is capable of being mounted in a server rack, such as, but not limited to, the rack 702. In this example, the multi-domain computing device 100 is mounted in a rack 702. The rack 702 may be implemented as any type of server rack or framework for mounting one or more computing devices. The rack 702 can optionally include one or more computing devices mounted on or within the rack. The rack 702 may be included within a motor vehicle, aircraft, data center, laboratory or any other location. In some examples, the rack 702 may be implemented as an EIA-310 standard nineteen-inch (19") rack. In other examples, other configurations are possible having various rack unit (RU) sizes as is known in the art, such as, for example, 2U, 3U, 4U and the like. In some examples, adapter plates (e.g., blanks, not shown) may be used to account for gaps in fitting.

The multi-domain computing device 100 in this example includes a set of two or more processors 704, a set of two or more power switches 708, a user interface device 706 and/or a set of one or more input/output devices 710. The set of processors 704 includes at least one processor dedicated to the first domain and at least one processor dedicated to the second domain. The set of processors may also include a graphics processor or any other types of processors.

The set of power switches 708 includes an on/off power switch for each unique domain supported on the multi-domain computing device 100. In this non-limiting example, the multi-domain computing device 100 supports two unique domains. Therefore, the set of power switches includes two power switches, one for domain A and another for domain B.

The user interface device 706 in some examples includes a graphics card for displaying data to the user and receiving data from the user. The user interface device 706 can also include computer-executable instructions (e.g., a driver) for operating the graphics card. Further, the user interface device 706 can include a display (e.g., a touchscreen display or natural user interface) and/or computer-executable instructions (e.g., a driver) for operating the display. The user interface device 706 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor.

The set of I/O devices 710 includes one or more devices for receiving input from a user and/or one or more devices for outputting data to a user. The set of I/O devices 710 may include a display device, touchscreen, keyboard, mouse, trackball or any other type of I/O device.

The multi-domain computing device 100 does not include data storage on the device. In some examples, each domain of the multi-domain computing device has Random Access Memory (RAM) installed that is capable of handling the sustained max load of operating all of its systems simultaneously, plus 20% for future growth. The multi-domain computing device 100 does not contain any hard drives or other user-accessible writable non-volatile memory.

In this example, data associated with the multi-domain computing device 100 is stored on a remote data store, such as, but not limited to, data storage device 718. The data storage device 718 can include one or more different types of data storage devices, such as, for example, one or more rotating disks drives, one or more solid state drives (SSDs), and/or any other type of data storage device. The data storage device 718 in some non-limiting examples includes a redundant array of independent disks (RAID) array. In other examples, the data storage device 718 includes a database. The data storage device 718 is connected to the multi-domain computing device via a network 712. The data storage device 718 in some examples is a data storage in a remote data center or a cloud storage.

The network 712 is implemented by one or more physical network components, such as, but without limitation, routers, switches, network interface cards (NICs), and other network devices. The network 712 may be implemented as any type of network for enabling communications with remote computing devices, such as, but not limited to, an ethernet, LAN, a subnet, a wide area network (WAN), a wireless (Wi-Fi) network, or any other type of network.

The multi-domain computing device 100 connects to the boot server 714 to obtain the boot image 716 via the network 712. In one example, the boot server is a DHCP server. In other examples, the multi-domain computing device 100 communicates with one or more remote computing devices via the network 712. The remote computing devices can include any type of computing device, such as, but not limited to, the user device 622.

In some examples, the multi-domain computing device 100 is capable of booting the operating system from a pre-boot execution environment (PXE) enabled network interface controller (NIC). The multi-domain computing device is capable of PXE booting from either the Gigabit Ethernet or fiber optic network interfaces. The multi-domain computing device is capable of booting from a remote server using DHCP. The multi-domain computing device is capable of streaming HD video over a network connection.

Some examples provide a multi-domain panel personal computer (MDPPC) in a single, integrated 19-inch rack-mountable workstation that permits a user to simultaneously network boot and operate two separate, fully isolated computers at different classification levels using a single 19-inch touchscreen display.

The system utilizes shared 115V 60-400 Hz power and keyboard/mouse inputs, but independent, electrically isolated, dual network interfaces (Ethernet and fiber optic), power buttons, smartcard readers, and headset jacks for each domain. The multi-domain computing device allows the user to perform secure video teleconferencing and VOIP phone calls using an integrated high-definition camera and headset jacks.

In other examples, the system provides a 100 W USB-C power-only (no data) port for charging/powering external laptops or other compatible peripherals without compromising data security. The system is a robust, versatile device that provides users numerous computer capabilities while overcoming challenges of similar technologies related to overall system size, weight, type and quantity of power, information security considerations, airworthiness requirements, network interfaces, and human-machine interfaces. By providing all of the included capabilities in one device, it improves the logistics and maintenance footprint compared to operating and maintaining multiple similar mission system workstations that are not currently interchangeable.

A common workstation, such as the multi-domain computing device 100 in some examples assists with frequent obsolescence issues experienced by small scale disparate legacy systems. Existing legacy mission system workstations are typically designed to just meet the bare capability requirements for a specific mission system. Each separate mission system has slightly different requirements, so each system's workstations are not interchangeable with the workstations in other mission systems.

For aircraft, there are numerous systems that each require their own uniquely designed, qualified, and maintained workstations. This limits capability growth in those systems, increases the cost of addressing obsolescence issues in multiple systems, and requires a large logistics footprint to maintain them. The system enables migrating to a virtualized mission system architecture. Other ruggedized commercial off the shelf (COTS) systems utilize only one set of computer hardware using virtual machines to separate data.

The multi-domain computing device in yet other examples provide a unique all-in-one common workstation that is designed to operate in a virtualized mission system architecture and while providing a user a wide range of capabilities. The system in an example provides two independent, isolated computer domains (motherboards, processors, memory, etc.) that allow for each domain to securely operate at a different security level.

In another example, stowage connectors are provided to mount metal dust caps tethered to the Ethernet connectors when not in use. This prevents the caps from banging or damaging other components. Other PCI cards may be installed in motherboards for added functionality in another non-limiting example.

Figure 8:
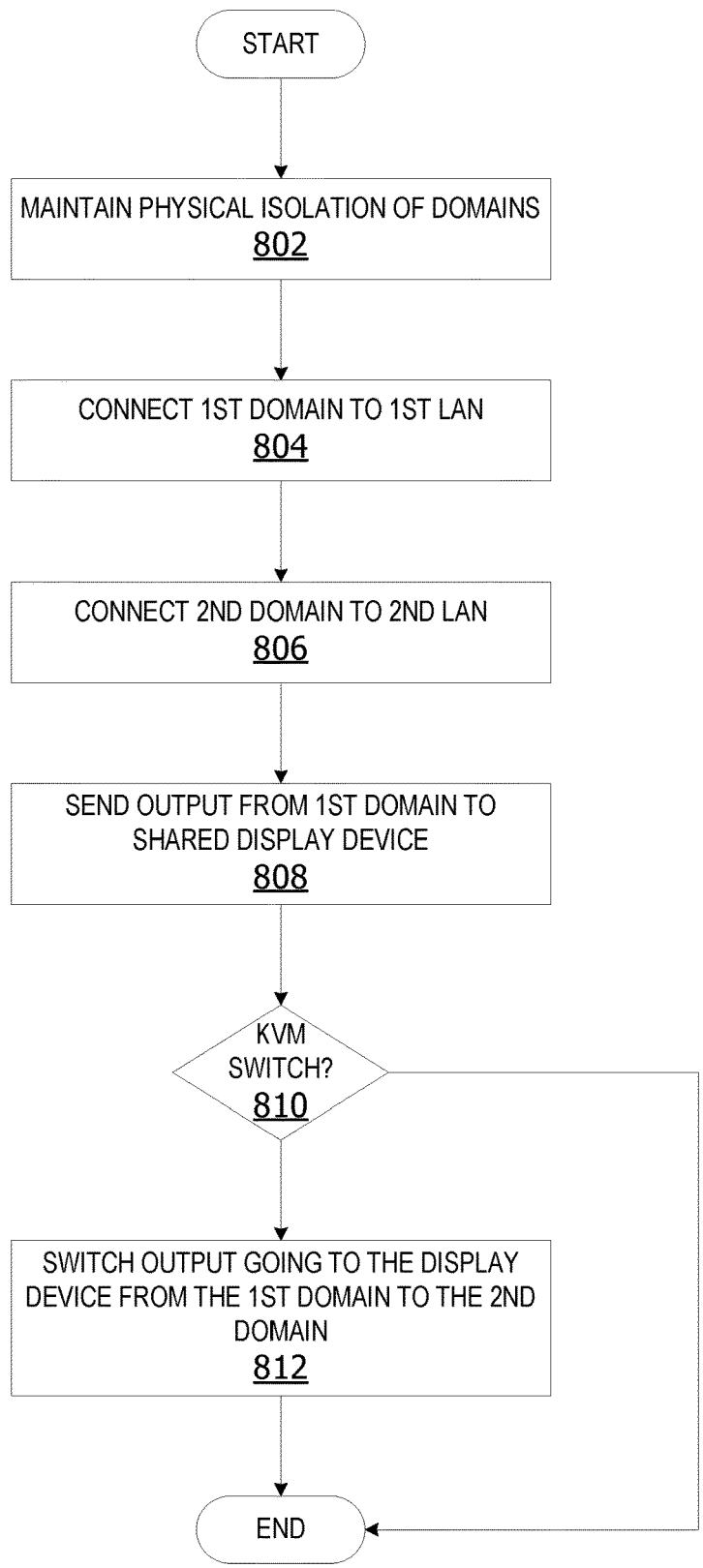
FIG. 8 is a flow chart 800 illustrating an implementation of a multi-domain computing device for switching input between input/output devices based on user-selection of a domain in accordance with an embodiment.

FIG. 8 is a flow chart 800 illustrating an implementation of a multi-domain computing device for switching input between input/output devices based on user-selection of a domain. The process begins by maintaining physical isolation of domains in a multi-domain computing device at 802. The physical isolation is maintained in some examples by providing separate motherboard, card reader, power switch and network connection device to each domain. The first domain connects to a first LAN at 804. The second domain connects to a different and separate second LAN at 806. Output from the first domain is sent to the shared display device for output to a user at 808. A determination is made whether the user activates a KVM switch to switch the display device from the first domain to the second domain at 810. If yes, the output going to the display device switches away from the first domain to the second domain at 812. In addition, the KVM switch will switch the peripheral inputs (keyboard, mouse, and touchscreen) from the first domain to the second domain. The display device then displays output received from the second domain rather than the output coming from the first domain. The process terminates thereafter.

Figure 9:
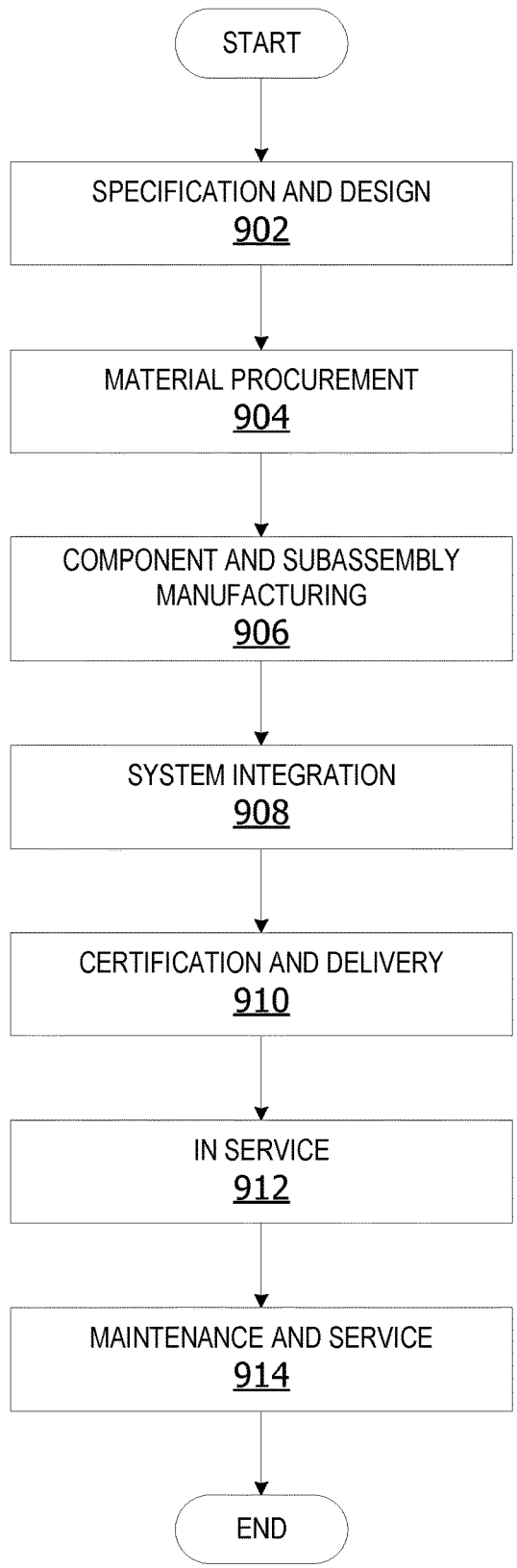
FIG. 9 is a block diagram of an apparatus of manufacturing and service method 900 that advantageously employs the multi-domain computing device in accordance with an embodiment.
Figure 10:
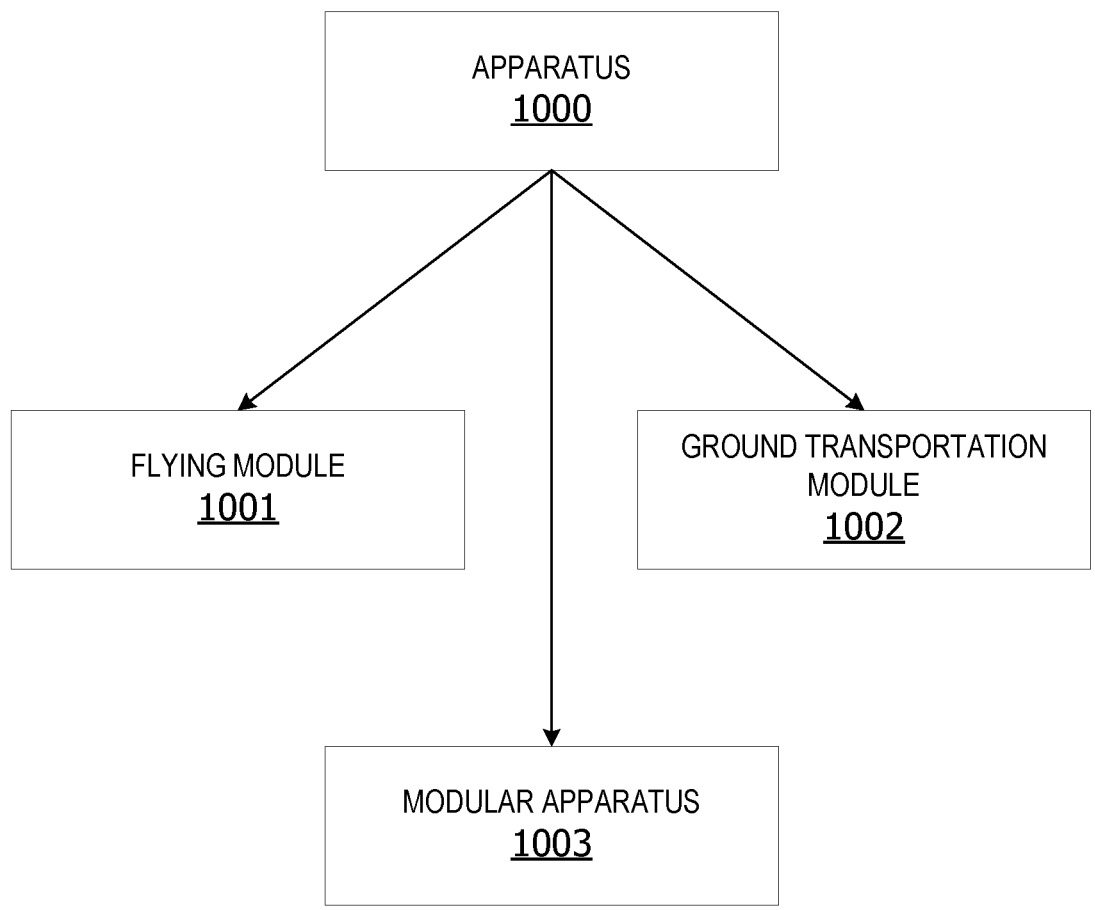
FIG. 10 is a block diagram of an apparatus 1000 that advantageously employs the multi-domain computing device in accordance with an embodiment.
Figure 11:
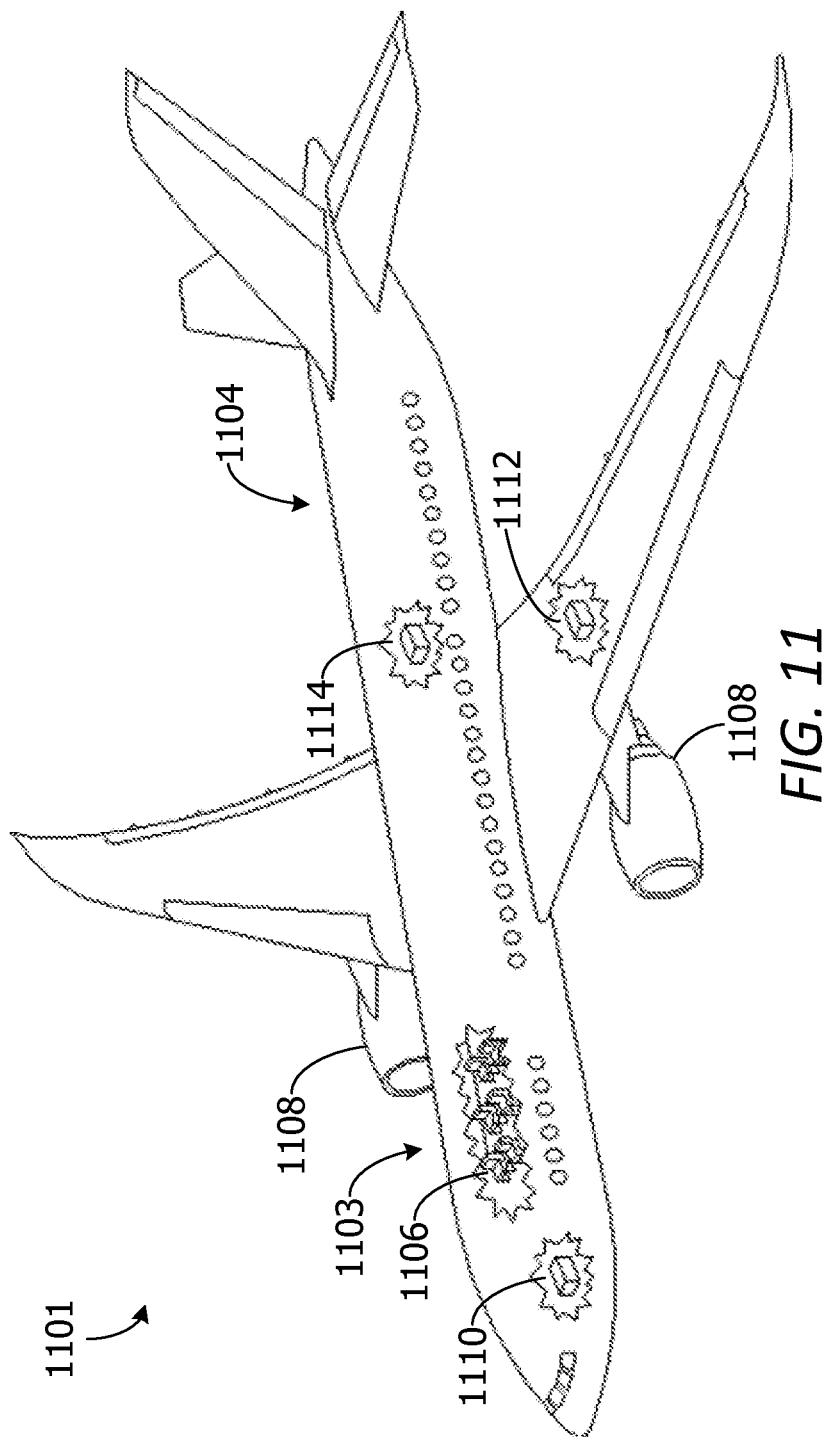
FIG. 11 is a schematic perspective view of a particular flying module 1101 in accordance with an embodiment.

Some examples of the multi-domain computing device (of FIG. 1) are used in manufacturing and service applications as shown and described in relation to FIGS. 9-11. Thus, implementations of the disclosure are described in the context of an apparatus of manufacturing and service method 900 shown in FIG. 9 and apparatus 1000 shown in FIG. 10. In FIG. 9, a diagram illustrating a non-limiting multi-domain computing device apparatus manufacturing and service method is depicted in accordance with an implementation. In one implementation, during pre-production, the apparatus manufacturing and service method 900 includes specification and design 902 of the apparatus 1000 in FIG. 10 and material procurement 904. The apparatus is a device, such as, but not limited to, the multi-domain computing device.

During production, component, and subassembly manufacturing 906 and system integration 908 of the apparatus 1000 in FIG. 10 takes place. Thereafter, the apparatus 1000 in FIG. 10 goes through certification and delivery 910 in order to be placed in service 912. While in service by a customer, the apparatus 1000 in FIG. 10 is scheduled for routine maintenance and service 914, which, in one implementation, includes modification, reconfiguration, refurbishment, and other maintenance or service described herein.

In one implementation, each of the processes of the apparatus manufacturing and service method 900 are performed or carried out by a system integrator, a third party, and/or an operator. In these implementations, the operator is a customer. For the purposes of this description, a system integrator includes any number of apparatus manufacturers and major-system subcontractors; a third party includes any number of vendors, subcontractors, and suppliers; and in one implementation, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 10, the apparatus 1000 is provided. As shown in FIG. 10, an example of the apparatus 1000 is a flying apparatus 1001, such as an aerospace vehicle, aircraft, air cargo, flying car, and the like. As also shown in FIG. 10, a further example of the apparatus 1000 is a ground transportation apparatus 1002, such as an automobile, a truck, heavy equipment, construction equipment, a boat, a ship, a submarine, and the like. A further example of the apparatus 1000 shown in FIG. 10 is a modular apparatus 1003 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 11, a more specific diagram of the flying apparatus 1001 including the multi-domain computing device is depicted in which an implementation of the disclosure is advantageously employed. The multi-domain computing device can be installed on an aircraft, such as the flying apparatus 1001 shown in FIG. 11. However, the examples are not limited to installation or implementation on aircraft. In other examples, the multi-domain computing device can be installed in a mobile device, such as, but not limited to, a ground vehicle (motor vehicle), marine vessel (water-borne craft), aircraft, or any other type of vehicle. For example, the multi-domain computing device can be installed inside an airplane, ship, boat, mobile home, etc. The multi-domain computing device can also be installed in a non-mobile device or building, such as, but not limited to, a data center, office, laboratory, ground-based mission support facility, etc.

In this example, the multi-domain computing device is installed within a flying apparatus 1001. The flying apparatus 1001 is an aircraft produced by the apparatus manufacturing and service method 900 in FIG. 9 and includes an airframe 1103 with a plurality of systems 1104 and an interior 1106. Implementations of the plurality of systems 1104 include one or more of a propulsion system 1108, an electrical system 1110, a hydraulic system 1112, and an environmental system 1114. However, other systems are also candidates for inclusion. Although an aerospace example is shown, different advantageous implementations are applied to other industries, such as the automotive industry, etc.

The following paragraphs describe further aspects of the disclosure:

1A. A switchable multi-domain system comprising:
- a user facing panel comprising a display device and a keyboard, video, mouse (KVM) switch configured to switch a set of shared devices from a first computing domain to a second computing domain, the set of shared devices including the display device, the first computing domain and the second computing domain being physically and communicably isolated from one another;
- a first processor dedicated to the first computing domain;
- a first power switch configured to power-up a set of first domain-specific devices, including the first processor, wherein the set of first domain-specific devices is configured to power up independently from the set of second domain-specific devices responsive to activation of the first power switch;
- a second processor dedicated to the second computing domain; and
- a second power switch configured to power-up a set of second domain-specific devices, including the second processor, wherein the set of second domain-specific devices is configured to power up independently from the set of first domain-specific devices responsive to activation of the second power switch.

2A. The multi-domain system of clause 1A, further comprising:
- a power source separately coupled to the first domain and the second domain to provide power to at least one electrically isolated domain within the multi-domain computing system.

3A. The multi-domain system of any one of clauses 1A-2A, further comprising:
- a first set of copper ethernet network connectors and a first set of fiber network connectors associated with the first computing domain, wherein the first computing domain is configured to connect to either copper ethernet or fiber optic network; and
- a second set of copper ethernet network connectors and a second set of fiber network connectors associated with the second computing domain, wherein the second computing domain is configured to connect to either the copper ethernet or the fiber optic network.

4A. The multi-domain system of any one of clauses 1A-3A, further comprising:
- a first card reader associated with the first computing domain; and
- a second card reader associated with the second computing domain.

5A. The multi-domain system of any one of clauses 1A-4A, further comprising:
- a chassis, wherein the set of first domain devices, the set of second domain devices and the set of shared devices are housed within the chassis.

6A. The multi-domain system of clause 5A, wherein the chassis is installed within an aircraft.

7A. The multi-domain system of any one of clauses 1A-5A, further comprising:

a boot server configured to provide a first boot image to the first computing domain and provide a second boot image to the second computing domain, wherein the first computing domain is configured to boot-up from the first boot image, and wherein second computing domain is configured to boot-up from the second boot image independently from the first boot image.

8A. The multi-domain system of any one of clauses 1A-7A, further comprising:
a first classification level associated with the first computing domain; and
a second classification level associated with the second computing domain, wherein the multi-domain computing device is configured to operate two separate, fully isolated computing systems at different classification levels simultaneously.

9A. The multi-domain system of any one of clauses 1A-8A, further comprising:
a first local area network (LAN) associated with the first computing domain, the first LAN linking a first domain motherboard to at least one of a fiber optic network connector and an Ethernet connector; and
a second LAN associated with the second computing domain linking a second domain motherboard associated with the second computing domain to at least one fiber optic network connector and the Ethernet connector, wherein architecture of the system provides network isolation between the first computing domain and the second computing domain.

10A. A method for switching between multi-domain computing systems, the method comprising:
maintaining physical isolation of a first computing domain from a second computing domain housed within a chassis associated with a multi-domain computing device, the multi-domain computing device comprising a first processor associated with the first computing domain and a second processor associated with the second computing domain;
connecting a first local area network (LAN) to the first computing domain and a second LAN to the second computing domain, wherein the first computing domain is network isolated from the second computing domain; and
switching output to a display device of the multi-domain computing device from the first computing domain to the second computing domain responsive to activation of a KVM switch from the first computing domain to the second computing domain.

11A. The method of clause 10A, further comprising:
routing input from a set of shared devices to the first processor associated with the first computing domain responsive to activation of the KVM switch to the first computing device; and
switching input from the set of shared devices from the first computing domain to the second processor associated with the second computing domain responsive to switching the KVM switch from the first computing domain to the second computing domain, the multi-domain computing device configured to maintain physical isolation of the first computing domain from the second computing domain.

12A. The method of any one of clauses 10A-11A, further comprising:
providing power from a single power source to a first processor associated with a first computing domain, responsive to user selection of a first computing domain power switch; and
providing power from the single power source to a second processor associated with the second domain responsive to user selection of a second domain power switch.

13A. The method of any one of clauses 10A-12A, further comprising:
connecting to a LAN via a copper ethernet or fiber optic network on a same computing domain.

14A. A multi-domain computing apparatus comprising:
a chassis housing:
a set of first domain-specific devices associated with a first computing domain, the set of first domain-specific devices comprising a first processor, a first card reader, a first headset jack, and a first power switch, wherein the first computing domain is configured to power up independently of a second computing domain responsive to activation of the first power switch;
a set of second domain-specific devices associated with the second computing domain, the set of second domain-specific devices comprising a second processor, a second card reader, a second headset jack, and a second power switch, wherein the second computing domain is configured to power up independently of the first computing domain responsive to activation of the second power switch;
a first set of copper ethernet network connectors and a first set of fiber network connectors associated with the first computing domain, wherein the first computing domain is configured to connect to either copper ethernet or fiber optic network;
a second set of copper ethernet network connectors and a second set of fiber network connectors associated with the second computing domain, wherein the second computing domain is configured to connect to either the copper ethernet or the fiber optic network; and
a set of shared devices associated with the first computing domain and the second computing domain, the set of shared devices comprising a domain-switchable display device and a KVM switch configured to switch the display device and peripheral devices from the first computing domain to the second computing domain.

15A. The multi-domain computing apparatus of clause 14A, further comprising:
a first LAN associated with the first computing domain; and
a second LAN associated with the second computing domain, wherein the first computing domain is network isolated from the second computing domain.

16A. The multi-domain computing apparatus of any one of clauses 14A-15A, further comprising:
a power source separately coupled to the first domain and the second domain to provide power to at least one electrically isolated domain within a multi-domain computing device.

17A. The multi-domain computing apparatus of any one of clauses 14A-16A, further comprising:
a boot server configured to provide a first boot image to the first computing domain and provide a second boot image to the second computing domain, wherein the first computing domain is configured to boot-up from the first boot image, and wherein the second computing domain is configured to boot-up from the second boot image independently from the first computing domain.

18A. The multi-domain computing apparatus of any one of clauses 14A-17A, further comprising:
a camera associated with the first computing domain, wherein the camera is inaccessible to the second computing domain.

19A. The multi-domain computing apparatus of any one of clauses 14A-18A, further comprising:
   a first classification level associated with the first computing domain; and
   a second classification level associated with the second computing domain, wherein a multi-domain computing device is configured to operate two separate, fully isolated computing systems at different classification levels simultaneously.

20A. The multi-domain computing apparatus of any one of clauses 14A-19A, wherein the multi-domain computing apparatus is a rack mountable computer, and further comprising:
   a rack associated with an aircraft, wherein the multi-domain computing apparatus is mountable within the rack.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A multi-domain system comprising:
   a multi-domain computing device comprising:
      a set of shared devices comprising a shared blackout button;
      a set of first domain-specific devices associated with a first computing domain;
      a set of second domain-specific devices associated with a second computing domain;
      a user facing panel comprising a display device and a keyboard, video, mouse (KVM) switch configured to switch the set of shared devices from the first computing domain to the second computing domain, the set of shared devices including the display device, the first computing domain and the second computing domain being physically and communicably isolated from one another, the shared blackout button configured to switch the display device to a black screen to enable a user to blackout an image displayed on the display device;
   a power source;
   a first power switch configured to power-up the set of first domain-specific devices, including a first processor, wherein the set of first domain-specific devices is configured to power-up independently from the set of second domain-specific devices responsive to activation of the first power switch, wherein the activation of the first power switch causes the set of first domain-specific devices to receive first power from the power source; and
   a second power switch configured to power-up the set of second domain-specific devices, including a second processor, wherein the set of second domain-specific devices is configured to power-up independently from the set of first domain-specific devices responsive to activation of the second power switch, wherein the activation of the second power switch causes the set of second domain-specific devices to receive second power from the power source,
   wherein the set of shared devices includes a Universal Serial Bus (USB) port that receives third power from the power source, wherein the USB port only permits the third power to flow out to power a device connected to the USB port, wherein wiring from the power source is connected to the USB port to bypass the sets of the first and second domain-specific devices so that network and data of the sets of the first and second domain-specific devices is unavailable for connection to the USB port.

2. The multi-domain system of claim 1, wherein the power source is separately coupled to the first computing domain and the second computing domain to provide power to at least one electrically isolated domain within the multi-domain computing device, further wherein the USB port receives the third power from the power source when one or more of the set of the first domain-specific devices or the set of the second domain-specific devices receives one or more of the first power or the second power.

3. The multi-domain system of claim 1, further comprising:
   a first set of copper ethernet network connectors and a first set of fiber network connectors associated with the first computing domain, wherein the first computing domain is configured to connect to either copper ethernet or fiber optic network; and
   a second set of copper ethernet network connectors and a second set of fiber network connectors associated with the second computing domain, wherein the second computing domain is configured to connect to either the copper ethernet or the fiber optic network.

4. The multi-domain system of claim 1, wherein the multi-domain computing device comprises:
   a first card reader associated with the first computing domain; and
   a second card reader associated with the second computing domain.

5. The multi-domain system of claim 1, wherein the multi-domain computing device comprises a chassis, wherein the set of first domain-specific devices, the set of second domain-specific devices and the set of shared devices are housed within the chassis.

6. The multi-domain system of claim 5, wherein the chassis is installed within an aircraft.

7. The multi-domain system of claim 1, further comprising:
   a boot server configured to provide a first boot image to the first computing domain and provide a second boot image to the second computing domain, wherein the first computing domain is configured to boot-up from the first boot image, and wherein second computing domain is configured to boot-up from the second boot image independently from the first boot image.

8. The multi-domain system of claim 1, further comprising:
   a first classification level associated with the first computing domain; and
   a second classification level associated with the second computing domain, wherein a multi-domain computing device is configured to operate two separate, fully isolated computing systems at different classification levels simultaneously.

9. The multi-domain system of claim 1, further comprising:
a first local area network (LAN) associated with the first computing domain, the first LAN linking a first domain motherboard within the multi-domain computing device to at least one of a fiber optic network connector and an Ethernet connector; and
a second LAN associated with the second computing domain linking a second domain motherboard associated with the second computing domain to the at least one fiber optic network connector and the Ethernet connector, wherein architecture of the system provides network isolation between the first computing domain and the second computing domain, and wherein the second domain motherboard is within the multi-domain computing device.

10. The multi-domain system of claim 1, wherein the first and second power switches are operatively connected to the power source.

11. A method for switching between multi-domain computing systems, the method comprising:
maintaining physical isolation of a first computing domain from a second computing domain, the first computing domain and the second computing domain being housed within a single chassis of a multi-domain computing device with a shared universal serial bus (USB) power-only charging port of the first and second computing domains;
connecting a first local area network (LAN) to the first computing domain and a second LAN to the second computing domain, wherein the first computing domain is network isolated from the second computing domain;
switching output to a display device of the multi-domain computing device from the first computing domain to the second computing domain responsive to activation of a keyboard, video, mouse (KVM) switch from the first computing domain to the second computing domain,
receiving power at the shared USB port from a power source; and
only permitting power to flow out from the USB port to power a device connected to the USB port, wherein wiring from the power source is connected to the USB port to bypass the first and second computing domains so that network and data of the first and second computing domains is unavailable for connection to the USB port.

12. The method of claim 11, wherein a first processor is associated with the first computing domain and a second processor is associated with the second computing domain, further wherein the receiving comprises the shared USB port receiving the power from the power source when one or more of the first computing domain or the second computing domain receives power from the power source.

13. The method of claim 12, further comprising:
routing input from a set of shared devices to the first processor associated with the first computing domain responsive to activation of the KVM switch to the first computing domain; and
switching input from the set of shared devices from the first computing domain to the second processor associated with the second computing domain responsive to switching the KVM switch from the first computing domain to the second computing domain, the multi-domain computing device configured to maintain physical isolation of the first computing domain from the second computing domain.

14. The method of claim 11, wherein the power source is a single power source, the method further comprising:
providing power from the single power source to a first processor associated with the first computing domain, responsive to user selection of a first computing domain power switch; and
providing power from the single power source to a second processor associated with the second computing domain responsive to user selection of a second domain power switch.

15. The method of claim 11, further comprising:
connecting to a LAN via a copper ethernet or fiber optic network on a same computing domain.

16. The method of claim 11, further comprising providing a user a capability of setting a basic input/output system (BIOS) password.

17. A multi-domain computing apparatus comprising:
a chassis housing;
a shared power source;
a set of first domain-specific devices associated with a first computing domain, the set of first domain-specific devices including a first card reader, a first headset jack, and a first power switch, wherein the first computing domain is configured to power up independently of a second computing domain responsive to activation of the first power switch, wherein the activation of the first power switch causes the set of first domain-specific devices to receive first power from the shared power source;
a set of second domain-specific devices associated with the second computing domain, the set of second domain-specific devices including a second card reader, a second headset jack, and a second power switch, wherein the second computing domain is configured to power up independently of the first computing domain responsive to activation of the second power switch, wherein the activation of the set of second power switch causes the second domain-specific devices to receive second power from the shared power source;
a first set of copper ethernet network connectors and a first set of fiber network connectors associated with the first computing domain, wherein the first computing domain is configured to connect to either copper ethernet or fiber optic network;
a second set of copper ethernet network connectors and a second set of fiber network connectors associated with the second computing domain, wherein the second computing domain is configured to connect to either the copper ethernet or the fiber optic network; and
a set of shared devices associated with the first computing domain and the second computing domain, the set of shared devices comprising a domain-switchable display device and a keyboard, video, mouse (KVM) switch configured to switch the display device and peripheral devices from the first computing domain to the second computing domain, wherein the set of shared devices comprises the shared power source supply that is operatively connected to the first and second power switches, wherein the set of shared devices includes a Universal Serial Bus (USB) port that receives third power from the shared power source, wherein the USB port only permits the third power to flow out to power a device connected to the USB port, wherein wiring from the shared power source is connected to the USB port to bypass the sets of the first and second domain-specific devices so that network and data of the sets of the first and second domain-specific devices is unavailable for connection to the USB port.

18. The multi-domain computing apparatus of claim 17, further comprising:
   a first LAN associated with the first computing domain; and
   a second LAN associated with the second computing domain, wherein the first computing domain is network isolated from the second computing domain.

19. The multi-domain computing apparatus of claim 17, wherein the shared power source is separately coupled to the first computing domain and the second computing domain to provide power to at least one electrically isolated domain within a multidomain computing device, further wherein the USB port receives the third power from the shared power source when one or more of the set of the first domain-specific devices or set of the second domain-specific devices receives one or more of the first or second power from the power source.

20. The multi-domain computing apparatus of claim 17, further comprising:
   a boot server configured to provide a first boot image to the first computing domain and provide a second boot image to the second computing domain, wherein the first computing domain is configured to boot-up from the first boot image, and wherein the second computing domain is configured to boot-up from the second boot image independently from the first computing domain.

21. The multi-domain computing apparatus of claim 17, further comprising: a camera associated with the first computing domain, wherein the camera is inaccessible to the second computing domain.

22. The multi-domain computing apparatus of claim 17, further comprising:
   a first classification level associated with the first computing domain; and
   a second classification level associated with the second computing domain, wherein a multi-domain computing device is configured to operate two separate, fully isolated computing systems at different classification levels simultaneously.

23. The multi-domain computing apparatus of claim 17, wherein the multi-domain computing apparatus is a rack mountable computer, and further comprising:
   a rack associated with an aircraft, wherein the multi-domain computing apparatus is mountable within the rack.

* * * * *

UNITED STATES PATENT AND TRADEMARK OFFICE
CERTIFICATE OF CORRECTION

PATENT NO. : 11,768,528 B2
APPLICATION NO. : 16/879225
DATED : September 26, 2023
INVENTOR(S) : Brandon M. Blair Page 1 of 1

It is certified that error appears in the above-identified patent and that said Letters Patent is hereby corrected as shown below:

In the Claims

At Column 23, Line 41, "domain," should be --domain;--;

At Column 24, Lines 61-62, "power source supply that" should be --power source that--.

Signed and Sealed this
Fifth Day of March, 2024

Katherine Kelly Vidal
*Director of the United States Patent and Trademark Office*